United States Patent [19]

Paul et al.

[11] Patent Number: 4,784,838

[45] Date of Patent: Nov. 15, 1988

[54] METHOD OF STABILIZING SOLUTIONS OF CHELATED POLYVALENT METALS

[75] Inventors: James M. Paul, DeSoto; Earl S. Snavely, Jr., Arlington, both of Tex.

[73] Assignee: Mobil Oil Corporation, New York, N.Y.

[21] Appl. No.: 188,054

[22] Filed: Apr. 26, 1988

Related U.S. Application Data

[63] Continuation of Ser. No. 927,998, Nov. 7, 1986, abandoned.

[51] Int. Cl.[4] ............................................. C01B 17/04
[52] U.S. Cl. ...................................... 423/226; 423/224; 423/243; 423/573.1; 55/73
[58] Field of Search ............... 423/220, 226, 243, 224, 423/573 R; 55/73

[56] References Cited

U.S. PATENT DOCUMENTS

| | | | |
|---|---|---|---|
| 3,933,993 | 1/1976 | Salemme | 423/573 |
| 4,076,621 | 2/1978 | Hardison | 423/573 R |
| 4,091,073 | 5/1978 | Winkler | 423/226 |
| 4,382,918 | 5/1983 | Diaz | 423/226 |
| 4,382,918 | 5/1983 | Diaz | 423/226 |
| 4,388,293 | 6/1983 | Diaz | 423/573 R |
| 4,421,733 | 12/1983 | Blytas | 423/226 |
| 4,518,577 | 5/1985 | Klecka | 423/226 |
| 4,532,118 | 7/1985 | Tajiri et al. | 423/226 |
| 4,536,382 | 8/1985 | Blytas | 423/243 |
| 4,622,212 | 11/1986 | McManus et al. | 423/573 R |
| 4,629,608 | 12/1986 | Lampton, Jr. et al. | 423/226 |
| 4,643,886 | 2/1987 | Chang et al. | 423/226 |
| 4,649,032 | 3/1987 | Snavely, Jr. et al. | 423/220 |
| 4,664,902 | 5/1987 | Fong et al. | 423/573 R |
| 4,705,676 | 11/1987 | Fong et al. | 423/226 |
| 4,741,888 | 5/1988 | Fong et al. | 423/224 |

Primary Examiner—Anthony McFarlane
Attorney, Agent, or Firm—Alexander J. McKillop; Michael G. Gilman; Stanislaus Aksman

[57] ABSTRACT

A cyclic process for removing $H_2S$ from a gaseous stream comprising contacting the gaseous stream with a solution of a chelated polyvalent metal to produce elemental sulfur, removing the elemental sulfur, and regenerating the reaction solution, e.g., by contacting it with oxygen, and recycling the regenerated solution to the reaction zone, is modified by introducing into the solution a free chelating agent. The introduction of the free chelating agent eliminates the loss of the polyvalent metal and the chelated polyvalent metal from the reaction solution.

There is also disclosed an aqueous reaction solution comprising a chelated polyvalent metal, sulfur, and a free chelating agent in the amount equal to at least about 0.1% by weight of the amount of the chelated polyvalent metal in the solution.

7 Claims, 1 Drawing Sheet

METHOD OF STABILIZING SOLUTIONS OF CHELATED POLYVALENT METALS

This is a continuation of copending application Ser. No. 927,998, filed on Nov. 7, 1986, now abandoned.

BACKGROUND OF THE INVENTION

I. Field of the Invention

The invention is directed to an improved method of removing hydrogen sulfide from gaseous streams. More particularly, the invention is directed to a method of stabilizing a reaction solution containing at least one polyvalent metal chelated with a chelating agent to prevent the loss of the chelating agent and the metal from the reaction solution.

II. Description of the Prior Art

The removal of hydrogen sulfide ($H_2S$) from gaseous streams, such as the waste gases liberated in the course of various chemical and industrial processes, for example, in the pulping of wood, natural gas and crude oil production and in petroleum refining, has become increasingly important in combating atmospheric pollution. Hydrogen sulfide-containing gases not only have an offensive odor, but such gases may cause damage to vegetation, painted surfaces and wildlife, as well as constitute a significant health hazard to humans. Government regulations have increasingly imposed continuously lower tolerances on the content of hydrogen sulfide which can be vented to the atmosphere, and it is now imperative in many localities to remove virtually all of the hydrogen sulfide under the penalty of an absolute ban on continuing operation of commercial plants which produce the hydrogen sulfide-containing gaseous streams.

The quantities of hydrogen sulfide in process gas streams are normally not very high. U.S. Pat. No. 3,071,433, dated Jan. 1, 1964 to Dunn, indicates that the stack gases obtained in the concentration of black liquor, the waste pulping liquor of the Kraft pulping process, contain from 500 to 2000 parts per million (ppm) of hydrogen sulfide. However, the odor of hydrogen sulfide can be detected by humans at a concentration of approximately 0.01 ppm. Consequently, an extremely efficient process for the removal of hydrogen sulfide is required to eliminate small amounts of noxious hydrogen sulfide from process gases.

It is known to effect the removal of hydrogen sulfide in an oxidation-reduction system by contacting the hydrogen sulfide-containing gas stream with a solution of a polyvalent cation (such as iron) complexed with a chelating agent (such as ethylenediaminetetraacetic acid or sodium salt thereof). In such a process, iron in the ferric state oxidizes the hydrogen sulfide to sulfur, the iron is reduced to the ferrous state, and the solution is regenerated by aeration to convert the iron to the ferric state. The sulfur is recovered from the solution by froth flotation, e.g., see Snavely et al, European Patent Application 82306861.4, filed on Dec. 22, 1982, Publication No. 0 086 919, published on Aug. 31, 1983.

U.S. Pat. No. 4,036,942 to Sibeud et al discloses a process for removing hydrogen sulfide and alkyl mercaptans from fluid streams by reacting the fluid streams with oxygen in the presence of a metal amino acid chelate in an aqueous solution containing an amine, resulting in the conversion of hydrogen sulfide to sulfur and alkyl mercaptans to dialkyldisulfides, and separating these from the aqueous metal chelate solution. However, the presence of oxygen in the reactants is disadvantageous in that it results in the conversion of some of the sulfur to sulfates and thiosulfates. Furthermore, the reaction requires a relatively long contact time between the metal chelate solution and the hydrogen sulfide-containing gas stream, such that if carbon dioxide is also present in the gas stream, the required contact time results in the absorption of carbon dioxide into the reaction solution, thus lowering the pH and lowering the efficiency of the reaction.

Diaz, U.S. Pat. No. 4,388,293, discloses a process of removing $H_2S$ from a sour gaseous stream comprising contacting the gaseous stream with an aqueous reactant mixture comprising an oxidizing polyvalent metal chelate compound or a mixture of oxidizing polyvalent metal chelate compounds and a stabilizing amount of thiodiglycolic or 3,3-thiodipropionic acid. Elemental sulfur is removed from the reactant mixture, which is then regenerated with oxygen.

U.S. Pat. No. 4,009,251 to Meuly also discloses a process for removing hydrogen sulfide and alkyl mercaptans from gaseous streams by oxidizing the hydrogen sulfide to sulfur substantially without the formation of sulfur oxides, in the presence of a metal chelate catalyst solution and a soluble alkali metal, or alkaline earth metal or ammonium or amine salt of an acid having a pK within the range of about 1.2 to about 6. The spent metal chelate catalyst solution is then regenerated with oxygen. The alkyl mercaptans are oxidized to dialkyldisulfides under the same conditions. Meuly attempts to eliminate the oxidation of hydrogen sulfide to sulfur oxides by the addition of the above-described acid salts. Such addition to the metal chelate catalyst solution is required since Meuly reacts the hydrogen sulfide-containing gas stream with oxygen and recognizes that sulfur oxides may be formed by such a reaction mixture. Furthermore, the process of Meuly requires relatively long contact times for oxidation, and thus when carbon dioxide is present in the hydrogen sulfide-containing gas stream, the relatively long contact time also results in the absorption of $CO_2$ and the consequential reduction in the pH of the solution and reduction in the efficiency of the system.

The entire contents of all of the above patents and publications are incorporated herein by reference.

In the processes utilizing polyvalent metal chelates, e.g., iron chelates, to remove $H_2S$ from the gaseous stream, such as in the process of Snavely et al, discussed above, there is a continuous but steady loss of the chelated polyvalent metal from the process solution, thereby requiring the addition of the chelated polyvalent metal to the process solution to maintain the $H_2S$-oxidizing capacity thereof. Some of the workers in the art have contributed the loss of the chelated polyvalent metal to biodegradation, i.e., metabolism of the chelated polyvalent metal by bacterial agents. Based on this hypothesis, it was proposed to introduce a broad spectrum biocide into the process solution in an amount sufficient to act as a bacteriostat to significantly lower the rate of growth of the bacteria and other microorganisms in the reaction solution, e.g., see Primack et al, U.S. Pat. No. 4,455,287. Other workers in the art attributed the loss of chelated metal to the oxidation of the chelant.

However, a need still exists in the art to provide a more efficient, simple and economic process of preventing the loss of the chelated polyvalent metal from the reaction solution comprising a chelated polyvalent metal used to remove hydrogen sulfide from a gas.

SUMMARY OF THE INVENTION

A method of removing H$_2$S from a gas by contacting it with a reaction solution of a chelated polyvalent metal is modified by introducing into the reaction solution a free chelating agent. The amount of the free chelating agent introduced into the reaction solution is a function of the elemental sulfur production rate and of the specific adsorption of the chelating agent on free sulfur, as is indicated by the following formula:

$$R = \frac{A \times S}{454 \text{ gm/lb}}$$

where
- R is the rate of the addition of the free chelating agent in lbs/hr;
- A is specific adsorption of the chelating agent on free sulfur in gm of chelating agent per pound of sulfur (gm/lb); and
- S is the rate of free sulfur production in lb/hr.

There is also disclosed an aqueous reaction solution comprising a chelated polyvalent metal, free elemental sulfur, and a free chelating agent in such an amount that the content of the free chelating agent in the solution is at least 0.1% by weight of the chelated polyvalent metal content.

DETAILED DESCRIPTION OF THE INVENTION

Figure 1:
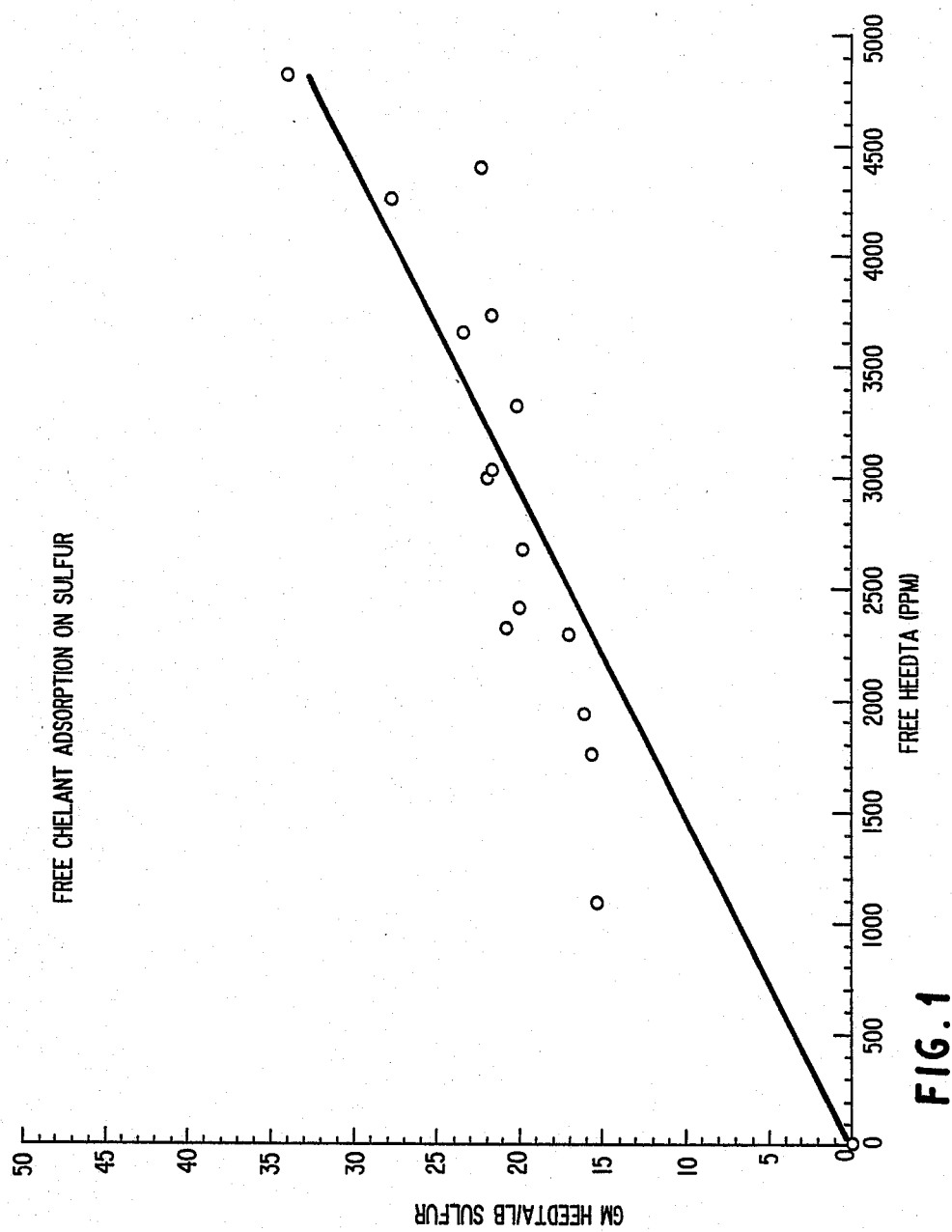
FIG. 1 is a graphical representation of the relationship between specific adsorption and concentration of free 2-hydroxy ethylethylene diamine triacetic acid (HEEDTA) in the reaction solution.

The rate of addition of the free chelating agent, R, into the reaction solution is directly proportional to specific adsorption, A, of the free chelating agent on free elemental sulfur. Although specific adsorption can be determined experimentally for every individual chelating agent in the manner discussed below, it is believed that it does not vary significantly between different chelating agents. Therefore, specific adsorption values for one agent can be used to estimate such values for a different agent for the purposes of this invention. Specific adsorption is a measure of the amount of the free chelating agent adsorbed by a unit weight of free sulfur as a function of the concentration of the free chelating agent in the process solution. Thus, the values of specific adsorption can be represented in the form of a graph of the specific adsorption values as a function of the free chelating agent concentration in the solution. The procedure for generating such a graph is discussed below.

Initially, a suspension of free sulfur in water is prepared. The concentration of sulfur in the suspension is 10-50 grams per liter (g/l). A known amount of a free chelating agent is then added to the suspension, while the suspension is stirred for a sufficient time and at a sufficient rate to produce a uniform solution. The sulfur is then separated from the suspension, e.g., by centrifuging or filtering, and the amount of the free chelating agent remaining in the suspension is determined in any known manner, e.g., by titration. The amount of the free chelating agent adsorbed by the free sulfur is then determined by subtracting the amount of the free chelating agent remaining in the solution from the known amount thereof initially added to the suspension. This procedure is repeated for several concentrations of the chelating agent, and the data is used to generate a curve of the amount of the free chelating agent adsorbed per unit weight of free sulfur as a function of the free chelating agent concentration (e.g., see the curve for HEEDTA in FIG. 1). The values of specific adsorption for a given concentration of the free chelating agent in the solution are then determined from the curve. Generally, the adsorption of the free chelating agent on free sulfur is substantially independent of the type of chelating agent. Thus, the curve of FIG. 1, it is believed, fairly represents the adsorption characteristics of free ethylene diamine tetraacetic acid (EDTA) and diethylene triamine pentaacetic acid (DTPA), in addition to HEEDTA. Specific adsorption values of all three chelating agents (HEEDTA, EDTA and DTPA), and other similar agents, may therefore be determined from the curve of FIG. 1. The amount of the free chelating agent adsorbed by the sulfur decreases slightly as pH of the reaction solution increases between the pH of about 5.0 and about 9.0.

To determine the necessary rate of addition of the free chelating agent, the rate of free sulfur production is first determined in any conventional manner. For example, the rate of sulfur production is easily computed from the rate of hydrogen sulfide introduction into the plant. The rate of free sulfur production is a function of each specific operation and it will vary for different plants, or, may even vary periodically for each given plant. The concentration of a polyvalent metal chelate in the process solution is then determined in any convenient manner, e.g., titration, precipitation analysis or, if the polyvalent metal chelate is ferric chelate, by an ultraviolet light absorption method, detailed below.

The desired concentration of the free chelating agent in the process solution, such as the solution of Snavely et al, discussed above, is then determined. That concentration is at least about 0.1%, preferably at least about 1% and most preferably at least about 10% of the concentration of the polyvalent metal chelate in the process solution. The value of specific adsorption for the desired concentration of the free chelating agent is then determined from the curve of the specific adsorption values for the thus-determined free chelating agent concentration. The rate of the free chelating agent addition is then calculated from the formula set forth above.

If the ferric chelate if used as the metal chelate, the most preferred method of determining the concentration thereof in the process solution is the ultraviolet (UV) light absorption method of a co-pending application, Ser. No. 838,848, filed on Mar. 12, 1986. The UV light absorption method is briefly summarized below.

The method comprises subjecting a ferric chelate (Fe$^{+++}$) solution to ultraviolet (UV) light radiation at the wavelength of about 237 to about 241 nanometers (nm), measuring the UV absorption of the solution, and then correlating the UV absorption to a previously-determined value of the ferric chelate concentration for the measured absorption. The ultraviolet light absorption is measured by any suitable means, e.g., a spectrophotometer operating in the UV spectrum at about 200 to about 400 nm. The solution is subjected to ultraviolet light radiation at the wavelength of about 237 to about 241, preferably about 238 to about 240, and most preferably at about 239 nm, since at the wavelength of about 239 nm, the ferric chelate exhibits the maximum absorption.

The method is particularly useful in measuring the amount of chelated ferric ions in impure process solutions containing, in addition to the ferric, and possibly, ferrous ions, other impurities, such as thiosulfate ($S_2O_3^=$), sulfate ($SO_4^=$), sulfide ($S^=$), sodium ($Na^+$), carbonate ($CO_3^=$) and/or bicarbonate ($HCO_3^=$) ions.

For optimum results, it is preferred to sample the process solution at a point in the process wherein the concentration of the chelated ferric ion is or should be the highest. Thus, for example, in the process of Snavely et al (see European Patent Application 82306861.4) the preferred point for sampling the process solution is just upstream of the mixers 20 (FIG. 1 of Snavely et al). It is important that the solution being tested for UV adsorption does not contain excessive amounts of chelated ferrous ion ($Fe^{++}$) since excessive ferrous ion concentration may have adverse effect on the UV absorption spectrum of the chelated ferric ion because UV light is absorbed in the similar wavelength by the ferrous and the ferric chelates. The maximum amounts of the chelated ferrous ion which may be present in the solution are unknown at this time. However, it is estimated that chelated ferrous ion can be present in the solution in the amount of up to 2% of the amount of the chelated ferric ion without causing undue interference with the absorption of the UV light by the chelated ferric ion in the solution.

Any UV spectrophotometer may be used in the method. However, it is important to use quartz cuvettes to avoid interference in the UV region by extraneous absorbing materials, e.g., plastic or impurities.

The addition of the free chelating agent to the process solution at the rate defined by the equation discussed above produces a process solution comprising a chelated polyvalent metal, a free metal cation, a free elemental sulfur, and a free chelate in the amount equal to at least about 0.1%, preferably about 1%, and most preferably about 10% by weight of the amount of the chelated polyvalent metal.

The free chelating agent introduced into the reaction zone is the same agent used to prepare the chelated polyvalent metal utilized to remove H₂S from gases. Any polyvalent metal that exists in more than one oxidation state can be used, such as iron, copper, manganese, lead, mercury, palladium, platinum, tungsten, nickel, chromium, cobalt, vanadium, titanium, tantalum, zirconium, molydenum and tin, preferably iron, copper and manganese, and most preferably, iron.

The chelated polyvalent metal or metals, also referred to herein as the polyvalent metal chelate or chelates, are usually used in the form of solutions in the process of the invention and they are coordination complexes in which the polyvalent metals form chelates with amino acids having one of the following general formulae:

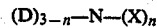

(I)

wherein
n is a number from 1 to 3;
X is selected from the class consisting of acetic and propionic acid groups;
D is 2-hydroxy ethyl, 2-hydroxy propyl, or an alkyl group having from 1 to about 4 carbon atoms; or

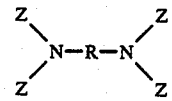

(II)

wherein
from two to four of the groups Z are selected from the class consisting of acetic and propionic acid groups;
from zero to two of the groups Z are selected from the class consisting of 2-hydroxy ethyl, 2-hydroxy propyl, and

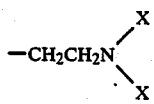

R is ethylene, propylene or isopropylene or, alternatively, cyclohexane or benzene, where the two hydrogen atoms replaced by nitrogen are in the 1,2-position, and X is as defined above.

In the most preferred embodiment, an iron chelate solution is used to remove hydrogen sulfide from a gaseous stream, and then the spent chelate solution is regenerated in the process of this invention with oxygen or an oxygen-containing gas, such as air. In this embodiment, the iron chelate solution should be capable of oxidizing hydrogen sulfide, while being reduced itself from a higher to a lower valence state, and should then be oxidizable by oxygen from the lower valence state to the higher valence state, in a typical redox reaction.

The polyvalent metal chelates are readily formed in aqueous solutions by the reaction of an appropriate salt, oxide or hydroxide of the polyvalent metal and chelating agent in the acid form or an alkali metal or ammonium salt thereof.

Suitable chelating agents used in the method of the invention are: amino acetic acids derived from ammonia or 2 hydroxy alkylamines, such as glycine, diglycine (amino diacetic acid), NTA (nitrilo triacetic acid), 2-hydroxy alkyl glycine; di-hydroxyalkyl glycine, and hydroxyethyl or hydroxypropyl diglycine; amino acetic acids derived from ethylene diamine, diethylenetriamine, 1,2-propylenediamine, and 1,3-propylene diamine, such as EDTA (ethylenediamine tetraacetic acid), HEEDTA, DTPA (diethylene triamine pentaacetic acid); amino acetic derivatives of cyclic 1,2-diamines, such as 1,2-diamino cyclohexane-N,N-tetraacetic acid, and the amides of polyamino acetic acids disclosed in U.S. Pat. No. 3,580,950 to Bersworth, the entire contents of which are incorporated herein by reference. In the most preferred embodiment, the polyvalent metal is iron and the chelating agent is EDTA, DTPA or HEEDTA.

Without wishing to be bound by any theory of operability, it is believed that the major cause of the loss of the chelating agent from the solution, and therefore of the polyvalent metal in the cyclic H₂S removal process described above, such as the process of Snavely et al, is the adsorption of the free chelating agent by the suspended free sulfur in the solution. As is known to those skilled in the art, all of the sulfur produced is in contact with the metal chelate solution and most of it remains suspended in the solution until it is transferred to the sulfur removal unit. The removal of sulfur is not complete, so that a small amount of sulfur is almost always inevitably present in the reaction solution. It is also known to those skilled in the art that at least a small amount of a chelated polyvalent metal disassociates in the aqueous solution to a free chelating agent and a free polyvalent metal. The amounts of the free chelating agent and the free polyvalent metal are controlled by a chemical equilibrium of the disassociation reaction in accordance with the following equation:

$$[MX]^{+++} \rightleftharpoons M^{+++} + X$$

where M is a polyvalent metal and X is a chelating agent. If the free sulfur in the solution adsorbs some of the chelating agent, X, thereby removing it from the solution, the equilibrium of the disassociation reaction promotes additional disassociation of the chelated polyvalent metal to produce more free chelating agent in an effort to maintain the equilibrium. Additional amounts of free polyvalent metal are formed as the result of the additional disassociation reaction. The free polyvalent metal precipitates as the hydroxide or a sulfide and the free chelating agent continues to be adsorbed by the elemental sulfur in the solution. This, in turn, promotes continued, additional disassociation of the chelated polyvalent metal. Accordingly, the amount of the chelated polyvalent metal available in the solution for the removal of $H_2S$ from the gaseous reaction is steadily decreasing and the efficiency of the $H_2S$ removal process is steadily deteriorating. Thus, without wishing to be bound by any theory of operability, the introduction of a free chelating agent into the reaction solution has the effect of promoting the equilibrium of the disassociation reaction of the chelated polyvalent metal into the direction of the stable chelated polyvalent metal. Accordingly, sufficient amounts of the chelated polyvalent metal are present in the reaction solution to remove hydrogen sulfide from a gaseous stream, and the concentration of the chelated polyvalent metal is maintained at a substantially constant level.

The following Examples further illustrate the essential features of the invention. However, it will be apparent to those skilled in the art that the specific reactants and reaction conditions used in the Examples do not limit the scope of the invention.

EXAMPLE 1

(Specific Adsorption Curve for HEEDTA)

A suspension of free sulfur was prepared by adding 10 grams (g) of free sulfur (S) to 200 ml of chelant solution, containing about 1200 parts per million by weight (ppmw) of 2-hydroxyethylethylene diamine triacetic acid (HEEDTA). The suspension was vigorously stirred in a Hamilton Beach blender, Model Number 612-3, at about 5000 rpm for 10 minutes to produce a uniform solution of HEEDTA. Sulfur was separated from the suspension by centrifuging an aliquot of the suspension in a Lourdes LCA-1 centrifuge at 15,000 rpm. The amount of the free chelating agent remaining in the aqueous solution was determined by titrating the solution with a standard calcium chloride ($CaCl_2$) solution containing 25 mg of $CaCl_2$, calculated as $CaCO_3$, per ml of the solution.

Ten ml of a 3% solution (wt) of sodium oxalate was added to the solution before the titration was commenced. When the initial end point was reached, as indicated by initial cloudiness of the solution, pH was adjusted to 11 with concentrated ammonium hydroxide ($NH_4OH$). The titration was continued until the final end point was reached. The amount of HEEDTA remaining in the solution was determined from the equation:

$$\text{free } HEEDTA = \frac{\text{ml titrant} \times 25 \text{ mg/ml} \times 2.78}{\text{wt of sample titrated}}$$

That amount was 715 parts per million by weight (ppmw). The amount of HEEDTA adsorbed by sulfur was calculated to be 485 ppmw by subtracting from the 1200 ppmw of HEEDTA 715 ppmw of HEEDTA remaining in the solution. Specific adsorption for 1200 ppmw of HEEDTA was calculated by dividing 485 ppmw by 10 gm of S and converting to the units of gm HEEDTA/lb of S. That value was 22 gm HEEDTA/lb of S. The above procedure was repeated several more times for different concentrations of HEEDTA. The values of specific adsorption were then plotted as a function of the respective HEEDTA concentrations to generate the curve of FIG. 1.

EXAMPLE 2

(Adjustment of HEEDTA Concentration in Cyclic $H_2S$ Removal Process)

An experimental scale process, operating substantially in the manner of Snavely et al (EPA 82306861.4) was used in this Example to determine the amount of free HEEDTA that needed to be added to the process to stabilize ferric ion chelated with HEEDTA.

The rate of sulfur production in the process was 2400 lbs/day or 100 lbs/hr. The iron chelate concentration in the process solution was 10,000 ppmw, as determined by Bausch & Lomb-Spectronic 2000 spectrophotometer operating at about 239 nm. Accordingly, the desired concentration of free HEEDTA in the solution was 10% that of the iron chelate, or 1000 ppmw. The specific adsorption, A, for 1000 ppmw of HEEDTA, from FIG. 1, is 6.8 gm/lb. The rate of free HEEDTA addition, R, was calculated as folllows:

$$R = 6.8 \text{ gm/lb} \times 100 \text{ lb/hr}/454 \text{ gm/lb} = 1.5 \text{ lb/hr}$$

Free HEEDTA was added to the process solution at the rate of 1.5 lb/hr. Minimal loss of the free chelant or precipitation of iron from the process solution were observed after free HEEDTA was continuously added to the solution for 72 hours.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. In a method of removing hydrogen sulfide ($H_2S$) from a gas by contacting the gas in a reaction zone with a reaction solution of a chelated polyvalent metal, thereby producing elemental sulfur (S), removing the elemental sulfur, regenerating the reaction solution, and recycling the regenerated reaction solution to the reaction zone, the improvement comprising introducing into the reaction zone a free chelating agent at the rate defined by the following equation:

$$R = \frac{A \times S}{454 \text{ gm/lb}}$$

where
- R is the rate of addition of the free chelating agent in lbs/hr;
- A is specific adsorption of the chelating agent on free sulfur in gm/lb; and
- S is the rate of free sulfur production in lb/hr; the rate R being sufficient to prevent the loss of the chelated polyvalent metal from the reaction solution due to the promotion of the disassociation of the chelated polyvalent metal into a free chelating agent and a free polyvalent metal and subsequent adsorption of the free chelating agent by the elemental sulfur and to maintain the content of the free chelating agent in the solution at about 0.1 to about 1.0% by weight of the chelated polyvalent metal.

2. A method of claim 1 wherein the polyvalent metal is iron.

3. A method of claim 2 wherein the chelated polyvalent metal is a coordination complex in which the polyvalent metal forms chelates with amino acids having one of the following two formulae:

$$(D)_{3-n}-N-(X)_n$$

wherein
- n is a number from 1 to 3;
- X is selected from the class consisting of acetic and propionic acid groups;
- D is 2-hydroxy ethyl, 2-hydroxy propyl, or an alkyl group having from 1 to about 4 carbon atoms; or

(II)

wherein from two to four of the groups Z are selected from the class consisting of acetic and propionic acid groups; from zero to two of the groups Z are selected from the class consisting of 2-hydroxy ethyl, 2-hydroxy propyl, and

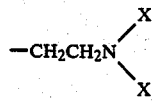

R is ethylene, propylene, isopropylene, cyclohexane or benzene, where the two hydrogen atoms replaced by nitrogen are in the 1,2-position, and
X is as defined above.

4. A method of claim 3 wherein the chelating agent is at least one amino acetic acid derived from ethylene diamine, diethylene triamine, 1,2-propylene diamine or 1,3-propylene diamine.

5. A method of claim 4 wherein the chelating agent is ethylene diamine tetracetic acid (EDTA), 2-hydroxy ethylethylene diamine triacetic acid (HEEDTA) or diethylene triamine pentaacetic acid (DETPA).

6. A method of claim 5 wherein the chelating agent is EDTA or HEEDTA.

7. A method of claim 6 wherein the reaction solution is an aqueous solution.

* * * * *